United States Patent
Essam

(10) Patent No.: US 7,407,328 B2
(45) Date of Patent: Aug. 5, 2008

(54) DEFORMABLE BEARING HOUSING

(75) Inventor: Steven A. Essam, Lincoln (GB)

(73) Assignee: Minebea Co. Ltd (JP)

( * ) Notice: Subject to any disclaimer, the term of this patent is extended or adjusted under 35 U.S.C. 154(b) by 350 days.

(21) Appl. No.: 10/527,542

(22) PCT Filed: Oct. 13, 2003

(86) PCT No.: PCT/GB03/04397

§ 371 (c)(1),
(2), (4) Date: Sep. 8, 2005

(87) PCT Pub. No.: WO2004/036071

PCT Pub. Date: Apr. 29, 2004

(65) Prior Publication Data

US 2006/0126982 A1   Jun. 15, 2006

(30) Foreign Application Priority Data

Oct. 15, 2002   (GB) .................... 0223983.8

(51) Int. Cl.
*F16C 35/04*   (2006.01)
(52) U.S. Cl. .................... 384/206; 384/428; 384/191.4; 29/898.045
(58) Field of Classification Search ................ 384/206; 403/132–137, 140; 29/874, 881, 898.044, 29/898.045, 898.049; 394/206–208, 191–191.4
See application file for complete search history.

(56) References Cited

U.S. PATENT DOCUMENTS

| 3,068,552 | A | * | 12/1962 | Williams et al. | ....... 29/898.046 |
|---|---|---|---|---|---|
| 3,253,330 | A | | 5/1966 | Davies | |
| 3,639,961 | A | | 2/1972 | Shiflet | |
| 3,986,250 | A | * | 10/1976 | Belsdorf | ..................... 403/134 |
| 4,109,364 | A | * | 8/1978 | Wisner | .................. 29/888.051 |
| 4,136,914 | A | | 1/1979 | Ostling | |
| 4,695,181 | A | * | 9/1987 | Rahmede et al. | ............ 403/135 |
| 4,747,203 | A | | 5/1988 | Yukita | |
| 4,893,548 | A | * | 1/1990 | Kawahara et al. | ............. 91/499 |

(Continued)

FOREIGN PATENT DOCUMENTS

GB   2012010   7/1979

(Continued)

*Primary Examiner*—Marcus Charles
(74) *Attorney, Agent, or Firm*—Hancock Hughey LLP

(57) ABSTRACT

A bearing housing to receive and be deformed around a ball having a predetermined radius R to form a bearing, an inner surface of the bearing housing being generally cup-shaped, having at least approximately circular symmetry around a central axis, and comprising: a cup portion of the radius R shaped to seat closely a first portion of a ball of radius R placed in the bearing housing; and a conforming portion lying in the plane which is perpendicular to the central axis and contains the centre of curvature of the cup portion, there being a clearance between the conforming portion and a second portion of the ball, the clearance being greater than any clearance between the cup portion and the first portion of the ball, the bearing housing being shaped such that, when the bearing housing is deformed around a ball having radius R to form a bearing, the bearing housing is deformed so that the conforming portion matches closely the shape of the second portion of the ball.

11 Claims, 2 Drawing Sheets

U.S. PATENT DOCUMENTS

| | | | | |
|---|---|---|---|---|
| 4,916,788 A | * | 4/1990 | Mitoya | 29/898.044 |
| 5,188,477 A | * | 2/1993 | Idosako et al. | 403/133 |
| 5,520,088 A | * | 5/1996 | Dixen | 92/71 |
| 5,855,448 A | * | 1/1999 | Showalter et al. | 403/134 |
| 6,006,652 A | * | 12/1999 | Peng | 92/71 |
| 6,082,923 A | * | 7/2000 | Maughan | 403/135 |
| 6,318,242 B1 | * | 11/2001 | Stoppek | 92/184 |

FOREIGN PATENT DOCUMENTS

| | | |
|---|---|---|
| GB | 2112058 | 7/1983 |
| GB | 2152580 | 8/1985 |
| JP | 2001065541 | 3/2001 |

* cited by examiner

DEFORMABLE BEARING HOUSING

This invention relates to a deformable bearing housing and method of forming a spherical bearing comprising a deformable housing and a ball using a swaging technique, and in particular concerns a deformable spherical bearing housing and method of forming a spherical bearing with a good fit between the bearing housing and the ball.

An effective technique for forming spherical bearings for heavy duty purposes is to provide a deformable bearing housing having a substantially hemi-spherical cup, place a ball of suitable size within the bearing housing, and then deform the bearing housing around the ball using a swage to form a finished spherical bearing. The spherical bearing housing is usually formed from a hard material, such as steel, while the ball comprises a softer material, such as copper. Such arrangements have inherent problems in achieving an accurate geometry. However, this technique can also be applied to all types of bearing where, for example, the ball might be of a harder material than the housing.

A deformable bearing housing for use in this technique comprises a generally annular ring, which displays approximately circular symmetry around a central axis. The inner surface of the ring comprises a counterface portion in the form of a hemi-spherical cup, which is shaped to receive and closely fit against the surface of a ball placed in the bearing housing, and an upstanding wall portion, which is substantially perpendicular to the central axis and allows the placement of the ball in the bearing housing to rest prior to deformation of the bearing housing. The hemi-spherical shape of the cup allows the counterface portion to lie against the lower half of the ball, up to and including the circumference of the ball taken in a plane perpendicular to the central axis and passing through the centre of the ball. This arrangement is shown in FIG. 1 of the accompanying drawings.

There are, however, problems associated with this design. It has been found that, when the wall portion is deformed around the ball with a swage as described above, the part of the inner surface at the junction of the cup and the wall portion, as well as other parts of the inner surface of the wall portion, press excessively tightly against the surface of the ball, thereby compressing and possibly deforming the ball as well as restricting the movement of the ball in the finished bearing leading to unpredictable torque qualities. Also, the inner surface of a bearing housing may comprise a series or pattern of ribs and grooves and excessive pressure as a result of swaging can result in localised imprints of the ribs on the surface of the ball. In addition, the free end of the wall portion is prone to "relaxing" away from the surface of the ball once the swaging force has been removed, leading to the formation of a gap between the free end of the inner surface of the wall portion and the ball in the finished bearing as shown in FIG. 2 of the accompanying drawings.

Known techniques for alleviating these problems rely on forming the bearing housing so that the wall portion deforms more readily than the cup area so that the cup area is not stressed. For instance, it is known to leave additional thickness of material around an outer surface of the bearing housing in the vicinity of the cup area, to strengthen this part of the bearing housing. Alternatively, it is known to remove material from the outer surface of the bearing housing in the vicinity of the wall portion, thereby making the wall portion less robust and more susceptible to deformation. However, these techniques suffer from the drawbacks of either making the bearing housing unnecessarily heavy, bulky and expensive, or weakening a part of the housing bearing, which can led to an increased likelihood of damage or failure.

It is an object of the present invention to seek to alleviate some or all of these problems.

Accordingly, one aspect of the present invention provides a bearing housing to receive and be deformed around a ball having a predetermined radius R to form a bearing, an inner surface of the bearing housing being generally cup-shaped, having at least approximately circular symmetry around a central axis, and comprising: a cup portion of the radius R shaped to seat closely a first portion of a ball of radius R placed in the bearing housing; and a conforming portion lying in the plane which is perpendicular to the central axis and contains the centre of curvature of the cup portion, there being a clearance between the conforming portion and a second portion of the ball, the clearance being greater than any clearance between the cup portion and the first portion of the ball, the bearing housing being shaped such that, when the bearing housing is deformed around a ball having radius R to form a bearing, the bearing housing is deformed so that the conforming portion matches closely the shape of the second portion of the ball.

Advantageously, the bearing housing further comprises an upstanding wall portion extending substantially parallel to the central axis and being shaped such that, when the bearing housing is deformed around a ball to form a bearing, the wall portion matches closely the shape of a third portion of a ball of radius R placed in the bearing housing.

Preferably, an inner surface of the wall portion is concave.

Conveniently, the radius of the arc of the concave wall portion is greater than the radius R.

Advantageously, the radius of the arc of the concave wall portion is at least double the radius R.

Preferably, the distance from the central axis to the wall portion at a free end of the wall portion is substantially equal to the radius R.

Another aspect of the present invention provides a bearing comprising a bearing housing according to the above, deformed around a ball having substantially the radius R.

A further aspect of the present invention provides a method of manufacturing a bearing, comprising the steps of: providing a bearing housing being generally cup-shaped, having at least approximately circular symmetry around a central axis, and comprising: a cup portion of the radius R shaped to seat closely a first portion of a ball of radius R placed in the bearing housing; and a conforming portion lying in the plane which is perpendicular to the central axis and contains the centre of curvature of the cup portion, there being a clearance between the conforming portion and a second portion of the ball, the clearance being greater than any clearance between the cup portion and the first portion of the ball; placing a ball having substantially the radius R in the bearing housing; and deforming the bearing housing around the ball in such a way that the conforming portion matches closely the shape of the second portion of the ball.

Conveniently, the step of providing a bearing housing comprises providing a bearing housing further comprising an upstanding wall portion extending substantially parallel to the central axis and being shaped such that, when the bearing housing is deformed around a ball to form a bearing, the wall portion matches closely the shape of a third portion of a ball of radius R placed in the bearing housing.

Advantageously, the step of providing a bearing housing comprises providing a bearing housing wherein an inner surface of the wall portion is concave.

Preferably, the radius of the arc of the concave wall portion is greater than the radius R.

Conveniently, the radius of the arc of the concave wall portion is at least double the radius R.

Advantageously, the step of providing a bearing housing comprises providing a bearing housing wherein the distance from the central axis to the wall portion at a free end point of the wall portion is substantially equal to the radius R.

Another aspect of the present invention provides a bearing housing to receive and be deformed around a ball having a predetermined radius R to form a bearing when the ball is placed at a predetermined initial location, an inner surface of the bearing housing having at least approximately circular symmetry around a central axis, and being shaped such that: when a ball having the radius R is placed in the initial location, a clearance is present between the inner surface of the bearing housing and the surface of the ball in the plane perpendicular to the central axis and passing through the centre of the ball; and when the bearing housing is deformed around the ball to form a bearing, the bearing housing is deformed so that the clearance between the inner surface of the bearing housing and the surface of the ball in the plane perpendicular to the central axis and passing through the centre of the ball is less than the clearance prior to deformation of the bearing housing.

Preferably, the bearing housing comprises two upstanding wall portions which extend in opposing directions substantially parallel to the central axis, the diameter of the opening at the free end of each wall portion being greater than or equal to the radius R and smaller than the diameter of the inner surface of the bearing housing, prior to deformation thereof, in the plane perpendicular to the central axis and passing through the centre of a ball having the radius R placed in the initial location A further aspect of the present invention provides a method of manufacturing a bearing, comprising the steps of: providing a bearing housing, an inner surface of the bearing housing having at least approximately circular symmetry around a central axis, and being shaped such that: when a ball having the radius R is placed in the initial location, a clearance is present between the inner surface of the bearing housing and the surface of the ball in the plane perpendicular to the central axis and passing through the centre of the ball; and when the bearing housing is deformed around the ball to form a bearing, the bearing housing is deformed so that the clearance between the inner surface of the bearing housing and the surface of the ball in the plane perpendicular to the central axis and passing through the centre of the ball is less than the clearance prior to deformation of the bearing housing; placing a ball having substantially the radius R in the initial position; and deforming the bearing housing around the ball to form a bearing.

In order that the present invention may be more readily understood, embodiments thereof will now be described by way of example, with reference to the accompanying drawings, in which.

Figure 1:
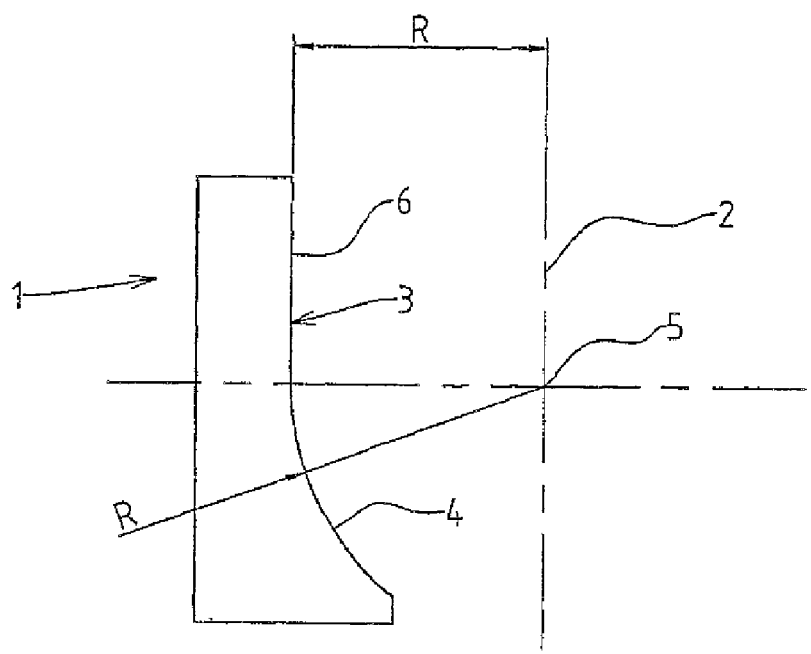
FIG. 1 shows a conventional deformable bearing housing prior to deformation.

FIG. 1 shows a cross-section through a part of a conventional deformable bearing housing 1, taken through the central axis of the conventional bearing housing 1. Although only one half of the cross-section is shown, it will be understood that the conventional bearing housing 1 displays circular symmetry around the central axis 2 thereof.

The bearing housing 1 is generally in the shape of an annular ring. As described above, the inner surface 3 of the conventional bearing housing 1 comprises a counterface surface, the lower portion of which is in the form of a cup 4, which is adapted to receive and match closely the shape of a ball of a predetermined radius R placed in the conventional bearing housing 1. Hence, it will be understood that each point on the surface of the cup 4 lies at a distance R from a centre point 5 of the conventional bearing housing 1, which corresponds to a point at which the centre of a ball having the radius R would lie if the ball were placed in the conventional bearing housing 1. The cup extends to and includes a point which lies on the plane perpendicular to the central axis 2 and passes through the centre point 5. In other words, the point at which the cup 4 ends surrounds the "equator" of a ball placed in the conventional bearing housing 1.

The inner surface 3 of the conventional bearing housing 1 also comprises an upstanding wall portion 6 which runs smoothly from the cup 4 and extends parallel to the central axis 2 terminating in a free end 13. Each point on the inner surface of the wall portion 6 lies at a distance R from the central axis 2, and it will be appreciated that this arrangement allows the insertion of a ball having a radius R into the conventional bearing housing 1 prior to deformation of the conventional bearing housing 1.

Figure 2:
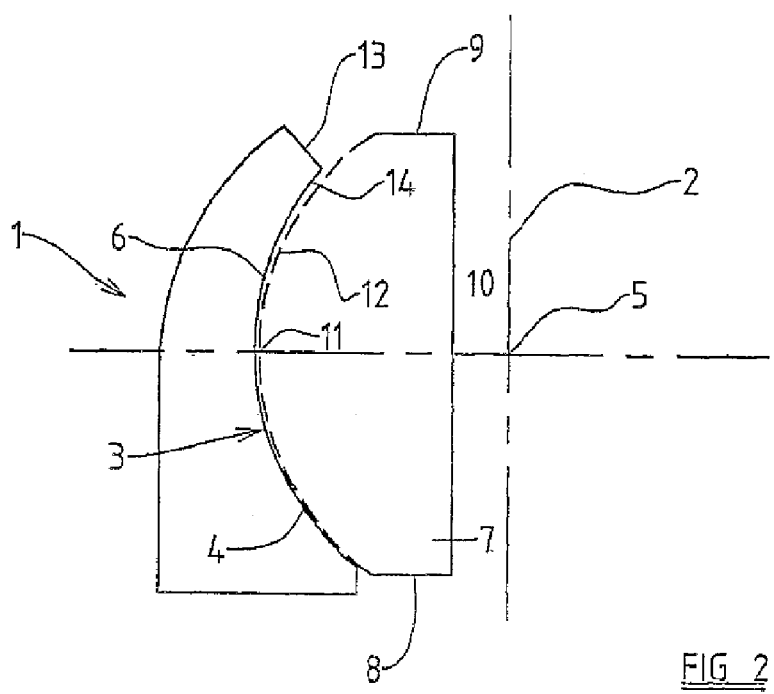
FIG. 2 shows the deformable bearing housing of FIG. 1 following deformation thereof around a ball.

FIG. 2 shows the conventional bearing housing 1 following deformation thereof around a ball 7 of radius R. The ball 7 is truncated at two parallel planes, so that it has flattened opposing surfaces 8, 9, and the ball is inserted so that these surfaces 8, 9 lie approximately perpendicular to the central axis 2. In this arrangement, only the portions of the ball that are not flattened contact the inner surface 3 of the conventional bearing housing 1. The ball 7 also has a central bore 10 therethrough, along a diameter passing through the flattened surfaces 8, 9, and in use of the finished bearing a shaft (not shown) may pass through the bore 10.

Deformation of the conventional bearing housing 1 is performed by a swage (not shown), which has an appropriate shape to deform the wall portion 6 of the conventional bearing housing 1 onto the top half of the ball 7, so that the counterface surface of the bearing housing 1 matches the shape of the corresponding portion of the ball 7. However, as discussed above, it has been found that a "tight spot" can occur at the junction 11 of the cup 4 and the wall portion 6 at the ball's equator. In addition, an intermediate portion 12 of the inner surface of the wall portion 6 is found to press against the corresponding portion of the surface of the ball 7 during and after deformation of the conventional bearing housing 1.

Finally, following deformation of the conventional bearing housing 1, the free end 13 of the wall portion 6 is prone to "relaxing", leaving a gap 14 between the inner surface of the free end 13 of the wall portion 6 and the surface of the ball 7.

It will be appreciated that the pressing of the inner surface 3 of the deformed conventional bearing housing 1 against the ball 7 at the tight spot 11 and the intermediate portion 12, as well as the existence of the gap 14, leads to a reduction in the performance of the finished bearing.

Figure 3:
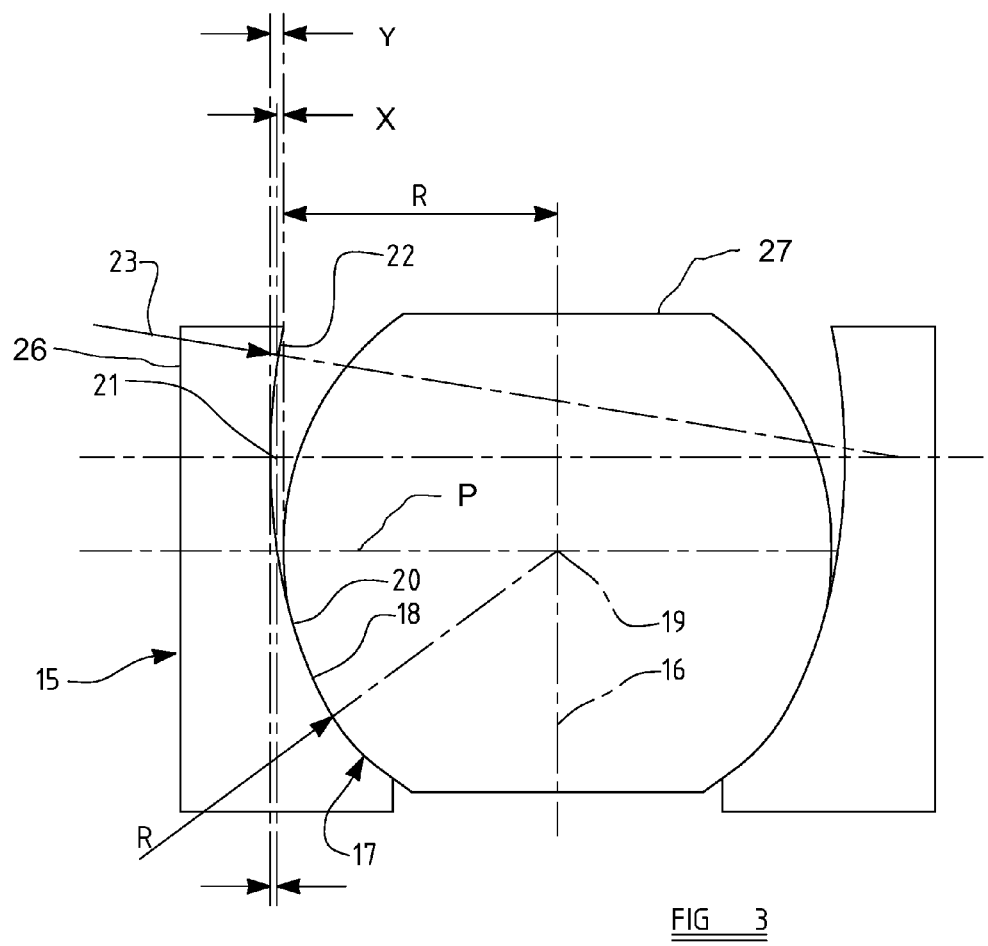
FIG. 3 shows a deformable bearing housing embodying the present invention.

Turning to FIG. 3, a deformable bearing housing 15 embodying the present invention is shown. The bearing housing 15 has substantially circular symmetry, so that the degree of circular symmetry is sufficient to form a functioning bearing after the swaging process.

The inner surface 17 of the bearing housing 15 comprises a counterface surface, the lower portion of which is in the form of a cup 18, each point of which lies at least approximately at a distance R from a centre point 19, which again corresponds to the point that the centre of a ball having radius R placed in the bearing housing 15 would occupy.

In contrast with the conventional bearing housing 1 described above, the cup 18 of the bearing housing 15 does not extend as far as the plane "P" that is perpendicular to the central axis 16 and passes through the centre point 19. (i.e. that part of the inner surface of the bearing housing 1 which would make contact with the equator of a ball 27 of radius R inserted in the housing 15). Rather, the cup 18 ends at a termination point 20 so that the cup 18 of the bearing housing 15 contacts less of the surface of a ball placed therein than does the counterface portion 4 of the conventional bearing housing. After the termination point 20, the inner surface 17 of the bearing housing 15 lies at a distance greater than R from the centre point 19.

The portion of the inner surface 17 of the bearing housing 15 that lies in the plane "P" perpendicular to the central axis 16 and passing through the centre point 19 lies at a distance which is greater than R from the centre point 19 by an amount "X" which is substantially larger than any clearance between the cup 18 and the ball. In preferred embodiments of the invention, the distance is substantially equal to the width of the gap 14 that occurs between the inner surface 3 of the conventional bearing housing 1 and the ball 7 due to relaxation of the conventional bearing housing 1 following deformation thereof.

An upstanding wall portion 26 of the inner surface 17 of the bearing housing 15, i.e. that which lies beyond the termination point 20, describes a smooth arc, which reaches a far point 21, at which the distance of the inner surface 17 from the central axis 16 ("R+Y") is greatest, before curving back in towards the central axis 16 to an end point 22. This smooth arc itself meets the cup portion 18 at a tangent to the radius of the cup portion 18, and so the entire inner surface 17 is comprised of a series of arcs with smooth transitions between the radii of the arcs so as to be substantially free of discontinuities. The distance of the end point 22 from the central axis 16 is preferably substantially equal to R, and it will be appreciated that this arrangement allows the insertion of a ball having radius R into the bearing housing 15 prior to deformation thereof.

Preferably, the radius of curvature 23 of the wall portion of the inner surface 17 is greater than R, and may be in greater than double R.

The inner surface 17 may be lined with a self-supporting liner, to make the finished bearing a self-lubricating bearing.

When a ball having radius R is inserted into the bearing housing 15 and the bearing housing 15 is deformed around the ball by use of a swage, it has been found that the configuration of the inner surface 17 of the bearing housing 15 substantially reduces or eliminates the "tight spot" described above in relation to the conventional bearing housing 1, as well as the unwanted additional pressure at the intermediate portion 12.

The portion of the inner surface 17 of the bearing housing 15 that lies in the plane perpendicular to the central axis 16 comprises a conforming portion, which distorts during swaging to conform to the shape of the ball in the region of the equator thereof.

In addition, due to the fact that the inner surface of the bearing housing 15 does not press forcefully against the surface of the ball during deformation, the end point 22 of the inner surface does not undergo substantial relaxation following deformation, and the existence of a gap between the inner surface 17 of the bearing housing and the surface of the ball is substantially reduced or eliminated.

Bearings of the type discussed herein can also be formed by providing a bearing housing which does not include a cup, but rather comprises two deformable portions. A ball may be inserted into the deformable bearing housing from either direction along the central axis of the bearing housing, and both deformable portions are subsequently deformed around the ball to form a bearing. The present invention is also applicable to this technique and the adaptation of the embodiment described herein for use with this technique will be readily apparent to a skilled person.

It will be appreciated that the present invention provides an effective method of improving the quality of bearings formed by the techniques discussed herein, thereby improving the performance and life of the bearings.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A bearing housing to receive and be deformed around, in use, a ball having a predetermined radius R to form a bearing, the bearing housing having approximately circular symmetry around a central axis, and comprising:

a cup portion having a centre of curvature of approximately the radius R and thereby shaped to seat closely, in use, a first portion of the ball placed in the bearing housing;

an upstanding wall portion having a concave inner surface and extending from the cup portion, the inner surface including a conforming portion lying about a plane that is perpendicular to the central axis and that contains the centre of curvature of the cup portion, there being a first clearance between the conforming portion and the equator region of the ball, the first clearance being greater than a second clearance between the cup portion and the first portion of the ball, the bearing housing being shaped such that, when the bearing housing is deformed around the ball to form a bearing, in use, the bearing housing is deformed so that the inner surface matches closely the shape of the ball.

2. A bearing housing according to claim 1, wherein the radius of the arc of the concave inner surface is greater than the radius R.

3. A bearing housing according to claim 2, wherein the radius of the arc of the concave inner surface is at least double the radius R.

4. A bearing housing according to claim 1, wherein the distance from the central axis to a free end of the upstanding wall portion is substantially equal to the radius R.

5. A bearing housing according to any preceding claim, deformed around the ball thereby to define a bearing.

6. A bearing housing according to claim 1, wherein the inner surface of the upstanding wall portion is provided with a series of arcs which each define a respective concave part of the inner surface.

7. A method of manufacturing a bearing, comprising the steps of:
providing a bearing housing having approximately circular symmetry around a central axis, and comprising:
a cup portion having a centre of curvature of approximately the radius R, thereby shaped to seat closely a first portion of a ball of radius R placed in the bearing housing;
an upstanding wall portion having a concave inner surface and extending from the cup portion, the inner surface including a conforming portion lying about a plane that is perpendicular to the central axis and that contains the centre of curvature of the cup portion, there being a first clearance between the conforming portion and the equator region of the ball, the first clearance being greater than a second clearance between the cup portion and the first portion of the ball;
placing a ball having substantially the radius R in the bearing housing; and deforming the bearing housing around the ball in such a way that the inner surface matches closely the shape of the ball.

8. A method according to claim 7, wherein the radius of the arc of the concave inner surface is greater than the radius R.

9. A method according to claim 8, wherein the radius of the arc of the concave inner surface is at least double the radius R.

10. A method according to claim 7, wherein the step of providing a bearing housing comprises providing a bearing housing wherein the distance from the central axis to a free end point of the upstanding wall portion is substantially equal to the radius R.

11. A method according to claim 7, wherein the concave inner surface is provided with a series of arcs which each defines a respective concave part of the inner surface.

* * * * *